United States Patent
Zmugg (10) Patent No.: US 11,620,820 B1
(45) Date of Patent: Apr. 4, 2023

(54) REPETITION REDUCTION FOR REAL-TIME TILE-BASED TEXTURE SYNTHESIS OF AERIAL IMAGERY

(71) Applicant: Blackshark.ai GmbH, Graz (AT)

(72) Inventor: René Zmugg, Graz (AT)

(73) Assignee: Blackshark.ai GmbH, Graz (AT)

( * ) Notice: Subject to any disclaimer, the term of this patent is extended or adjusted under 35 U.S.C. 154(b) by 0 days.

(21) Appl. No.: 17/831,031

(22) Filed: Jun. 2, 2022

(51) Int. Cl.
*G06V 20/17* (2022.01)
*G06T 15/20* (2011.01)
*G06T 7/11* (2017.01)
*G06V 20/10* (2022.01)
*G06V 20/13* (2022.01)

(52) U.S. Cl.
CPC ............... *G06V 20/17* (2022.01); *G06T 7/11* (2017.01); *G06T 15/205* (2013.01); *G06V 20/13* (2022.01); *G06V 20/182* (2022.01); *G06V 20/188* (2022.01); *G06T 2207/30188* (2013.01)

(58) Field of Classification Search
CPC ...... G06T 7/11; G06T 15/205; G06T 2207/30188; G06V 20/13; G06V 20/17; G06V 20/182; G06V 20/188
See application file for complete search history.

(56) References Cited

U.S. PATENT DOCUMENTS

| | | | | |
|---|---|---|---|---|
| 8,634,653 B1* | 1/2014 | Castelaz | ............... | G06V 20/13 382/181 |
| 11,074,447 B1* | 7/2021 | Fox | ........................ | G06V 20/17 |
| 2011/0316854 A1* | 12/2011 | Vandrovec | ............ | G06T 17/205 345/420 |
| 2018/0189954 A1* | 7/2018 | Albrecht | .................... | G06T 7/12 |
| 2020/0364878 A1* | 11/2020 | Bradski | .................. | G06N 3/084 |
| 2021/0019494 A1* | 1/2021 | Deskevich | ............ | G06V 10/70 |
| 2021/0133936 A1* | 5/2021 | Chandra | ............... | G06V 10/774 |
| 2021/0142559 A1* | 5/2021 | Yousefhussien | ........................... | G06Q 10/06315 |

OTHER PUBLICATIONS

Diaz-Varela et al. "Automatic identification of agricultural terraces through object-oriented analysis of very high resolution DSMs and multispectral imagery obtained from an unmanned aerial vehicle." Journal of environmental management 134 (2014): 117-126. (Year: 2014).*

Global Terrain Technology for Microsoft ESP White Paper, Adam Szofran, Jan. 2008.

* cited by examiner

*Primary Examiner* — Katrina R Fujita
(74) *Attorney, Agent, or Firm* — Beyer Law Group LLP (57) ABSTRACT

Input coordinates identify a tile on the globe and a biome is identified for each pixel of the tile. We choose a random segmentation mask of the corresponding biome for the tile. Every segment of the mask carries a unique identifier and access to a random value via a corner reference. These parameters ensure that (when executed in parallel) each pixel with the same identifier and random value is handled the same way. For each pixel of the tile, using the selected mask, we identify the segment corresponding to that pixel, we retrieve a color variation for that pixel based upon the segment identifier and the random value. We thus choose a color variation for each segment of a segmentation mask. Pixels in the same segment are treated the same way. Instead of a color variation for flat areas (crop fields) we choose a density variation for regions like forests.

22 Claims, 7 Drawing Sheets

FIG. 1

Schematic of Quadtree Paradigm

FIG. 2
Segmentation Mask

FIG. 3
Contiguous Segmentation Masks

REPETITION REDUCTION FOR REAL-TIME TILE-BASED TEXTURE SYNTHESIS OF AERIAL IMAGERY

FIELD OF THE INVENTION

The present invention relates generally to synthesis of aerial imagery. More specifically, the present invention relates to reducing repetition in synthesized aerial imagery.

BACKGROUND OF THE INVENTION

As known in the art, aerial imagery refers to images, maps, aerial photographs, etc., which are typically used to create a digital version of the world's surface for use in games, maps, planning, research, etc. Satellite imagery may also be used. Such images can also be related to a geographic coordinate system via the internal coordinate system of the images.

Aerial images are often structured in a quad tree in order to cover the globe with images of varying detail. A quad tree represents a data set (such as the globe) initially as one tile and if further detail is available, a new level of detail is introduced by replacing the initial tile with four tiles of increased resolution. This process can then be repeated until data of the highest quality is placed at the bottom of the tree. At low levels of detail satellite imagery is used and farther down the quad tree a switch to aerial imagery happens.

For the use case to build a digital twin of the world (e.g., a digital re-creation based on real-world data) one cannot solely rely on aerial imagery to create an immersive 3-D space. Aerial imagery comes with several issues, like varying quality, censored regions, colorization issues, shadows, clouds, etc. These issues can be resolved by synthesizing affected regions with a convincing replacement for an aerial image. Furthermore, due to the vast amount of aerial imagery needed to cover and re-create the whole globe, a stable internet connection is required to stream this data to an application in real time that is using the imagery. But if such a stable connection is not available, a way to fully synthesize the whole globe is required offline.

Synthesis offline for that application comes with several requirements. The synthesized result needs to be provided in real time, consistent throughout all levels of detail of the quad tree that covers the globe, and repetition of features should not be noticeable. Unfortunately, prior art approaches especially for relatively flat stretches of land produce repetition of features that are noticeable, producing a low-quality synthesized result.

Accordingly, new techniques and systems are desired that reduce repetition in real-time, tile-based texture synthesis of aerial imagery.

SUMMARY OF THE INVENTION

To achieve the foregoing, and in accordance with the purpose of the present invention, a technique for texture synthesis that reduces repetition is disclosed.

The present invention is a lightweight method to create tile-based synthesized replacements for aerial images that look realistic and reduce visible repetitions without the need of very huge collections of biome texture variations.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
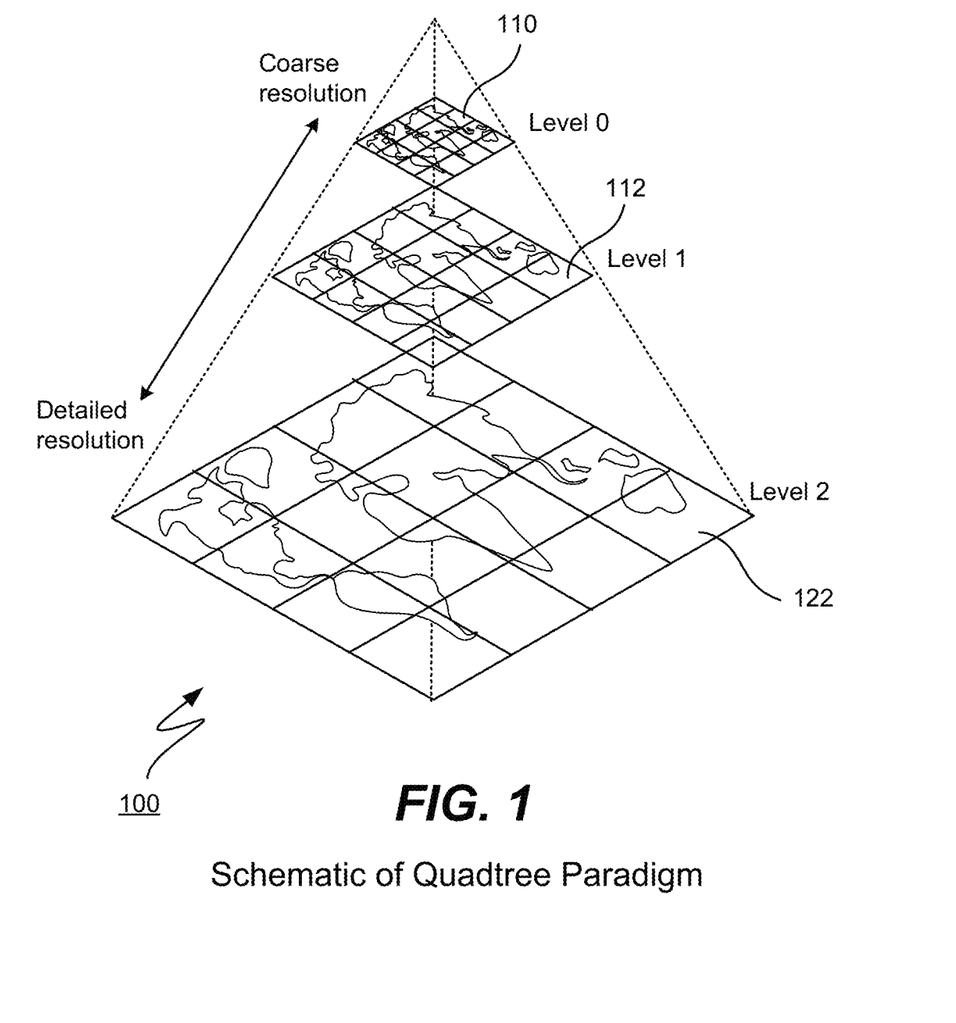
FIG. 1 is a schematic of a quad tree paradigm that may be used with the present invention.

FIG. 1 is a schematic 100 of a quad tree paradigm that may be used with the present invention. As mentioned, quad tree 100 represents a data set (such as the globe) initially as one tile 110 and if further detail is available, a new level of detail is introduced by replacing the initial tile with four tiles of increased resolution. For example, at level 0 a single tile 110 is used to represent the globe, at the next level 1 four tiles 112 represent the globe and at level 2 sixteen tiles 122 represent the globe. As shown, level 0 is a coarse resolution and as one goes down the quad tree more detailed resolution is found. Typically, a base level of detail (bLoD) refers to one of the levels in the quad tree and may be arbitrarily chosen depending upon the context or application. Typically, the location of the user above the globe in a software application and the distance to the surface dictates which level of the quad tree is used to render the environment for the user of the application. Thus, the closer one is to the surface the deeper you are in the quad tree, the more tiles the application needs to process in real time as a user moves over the surface (or flies above the surface), etc.

A basic texture synthesis approach takes the following as input:
 world-wide biome distribution (BD)
 digital elevation map (DEM)

For every biome defined in the BD a biome texture set, which contains multiple textures depicting the biome in question, is created, and these textures are suitable for use on tiles. Further, these textures are created for a certain base level of detail (bLoD) of the global quadtree. As known in the art, a biome is a region of the earth which has a distinct textured surface from other regions, such as crop fields, artificial surfaces, forests, marsh, deserts, etc.

A common texture synthesis approach uses the biome distribution, applies some methods to add more details to the biome transition borders, chooses random textures for every bLoD tile and synthesizes the world accordingly. Unfortunately, this approach has issues with repetition. No matter how big the texture sets are, on vast regions of the same biome duplicated textures are very noticeable. A DEM can be used to improve areas with elevation differences like mountains with remapping rules that are applied at a certain slope or altitude, but it is realized that flat regions cannot profit from this at all. By way of example, flat regions such as fields, artificial surfaces, deserts, certain forests, etc. will have very noticeable repetition that detracts from the quality of the resulting synthesized region.

In fact, prior art approaches may simply stitch photographs together in which roads and buildings in one photograph do not match with any roads and buildings in an adjacent photograph. Or, the same image or texture of a crop field may be repeated several times in a particular region, all of which looks very unrealistic to a user of the application and detracts from the quality of the rendered 3-D environment.

It is further realized that for real-time software applications executing offline (e.g., without a stable Internet connection) it is not feasible to store all of the aerial imagery data locally; the amount of data required for an application that allows a user to fly over the globe (for example) is far too large. It is therefore realized that an improved texture synthesis technique requires far less data to be stored locally and has far less repetition than in the prior art. Especially for flat regions, the improved texture synthesis technique reduces repetition thus avoiding problems found in the prior art.

Puzzle Biome

The present invention introduces a so-called Puzzle Biome to add variation to flat regions that are covered by one biome. A prime example for this use case are crop field regions, which usually span very large stretches of land. In such regions, repetitions within tile textures are easily spotted and the Puzzle Biome is useful to add variation so that the repetition is not noticeable.

A Puzzle Biome, e.g., a crop field region, has a specific texture set, which consists of two parts:
Segmentation masks (the puzzle pieces)
Color variations There may be many different texture sets used to cover the entire globe, the puzzle biome having a specific texture set used for relatively flat regions. For example, there may be puzzle biome texture sets for crop fields, humid crop fields, orchards, vineyards, natural vegetation, all kinds of forests (tropical, broadleaf, etc.), deserts, high deserts, high arid deserts, salt flats, etc. The present disclosure contemplates about 200 different texture sets for the whole world, some of these being the puzzle biomes mentioned above, used for various types of these flat regions. Based upon a latitude and longitude (for example) the system knows the location upon the earth and may therefore choose the appropriate puzzle biome to add texture and color to that region.

Figure 2:
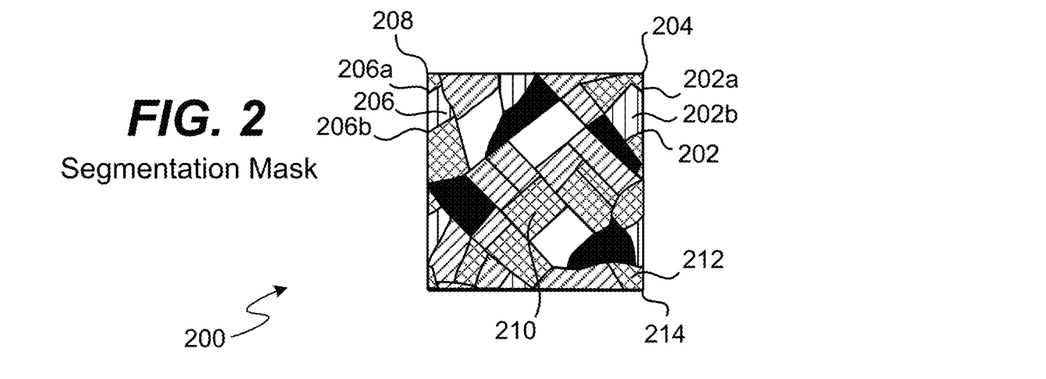
FIG. 2 illustrates a segmentation mask.

FIG. 2 illustrates a sample segmentation mask 200 that defines a distribution of shapes as shown. There may be a multitude of different segmentation masks within a particular biome texture set. Preferably, the dimensions of mask 200 are the dimensions of one tile, specifically one tile of base LoD (level of detail). Shown is a particular segment 202 which may also be referred to as a "shape." A segmentation mask should fulfill the following conditions:

Ability to match with the other segmentation masks in the texture set.
Each segment has a unique identifier and a reference to a corner of its segmentation mask.
Segments at the border reference the correct corners and have the same identifier.

Regarding the ability to match with other segmentation masks in the texture sets, consider if a copy of mask 200 were placed next to the original mask 200 (i.e., to the right of mask 200). These two masks will match because segment 206 of the copy will match with segment 202 of the original when they are next to one another. In other words, line 202a will match with line 206a and line 202b will match with line 206b, providing a smooth transition from segment 202 of the original to segment 206 of the copy such that the border between the two is not visible. Another way to visualize this is to consider that points 202a and 202b are the same distance from corner 204 as are points 206a and 206b from corner 208. Another example of segmentation masks that match is provided below in FIG. 3. Masks should match whether they are placed side to side or one above the other. In addition, segments from masks placed next to one another will have the same unique identifier, e.g., segments 202 and 206 if placed next one another will have the same unique identifier.

Each segment of a mask will also have a unique identifier stored within its segmentation mask and a corner reference; the unique identifier may be a 16-bit unique identifier and the corner reference 8 bits. In one particular embodiment, the unique identifier of the segment is the red and green channel (RG) used within that segment and the corner reference is the blue channel (B). Thus, a blue channel representation of a mask showing its segments will show four different shades of blue used to color its segments, one shade of blue per corner; in this way, each segment references one of the corners of the mask. A red/green representation of a mask will have many different colors. Other techniques for storing the unique identifier and corner reference may also be used.

Thus, all pixels within a particular segment will have the same unique identifier and will reference the same corner, such as corner 204, 208, or 214. Each segment may reference any of the corners and will have a reference to one corner. Each corner will also have a reference to a random value (which is precalculated) and preferably, these random values are precalculated for the entire globe. Only references to the corners are stored (e.g., an 8-bit identifier); the random value is not stored within a segmentation mask. During execution, a corner is referenced which then tells us which random value from the precalculated values to use. When a base LoD tile is processed from anywhere on the globe we will choose a segmentation mask randomly for that tile.

Segments at a border will also reference correct corners and have the same identifier. In other words, assuming that a copy of mask 200 is placed next to its original, segments 202 and 206 will be next one another and will match, will have the same unique identifier, but will reference different corners in their own segmentation mask, which actually is the same location on the globe. In other words, if a copy of mask 200 is placed next to original mask 200 along its right-hand edge, then if segment 202 at the right border references the NE corner, it's counterpart segment 206 placed next to it needs to reference the NW corner of its own mask, which is effectively the same location. Both segments (which are now a continuous segment) will now reference the same random value associated with that location.

For segments on a border (i.e., segments 202 or 206 but not segment 210), that segment must reference one of the two corners along its edge, that is, segment 202 must reference corner 204 or 214. Segments not along a border, such as segment 210, may reference any corner. Segments at a corner, such as segment 212, must reference its particular corner, such as corner 214. Thus, if four segmentation masks are placed around corner 214, each of the segments surrounding that corner will reference that corner. Thus, the random value at a corner will dictate the color variations of the segments. By taking the unique identifier for a segment, combined with the random value at its referenced corner, one obtains a reference to particular color variation, as will be explained below.

Figure 3:
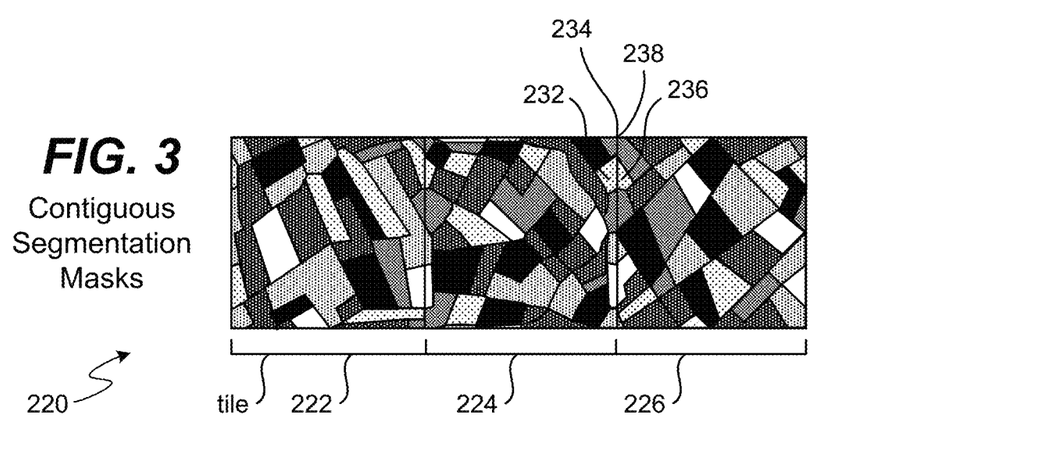
FIG. 3 illustrates continuous segmentation masks.

FIG. 3 illustrates continuous segmentation masks 220. As shown, three segmentation masks 222-226, each the size of one base level of detail tile, are placed next one another. As shown, segments 232 and 236 are placed next one another, and the border is not visible due to the contiguous nature of segments between the two masks. At each of the boundaries between tiles 222 and 224, and between 224 and 226, matching segments are continuous and the boundaries are not visible. Also shown is corner 234 of mask 224 and corner 238 of mask 226 which are effectively the same corner.

Figure 4:
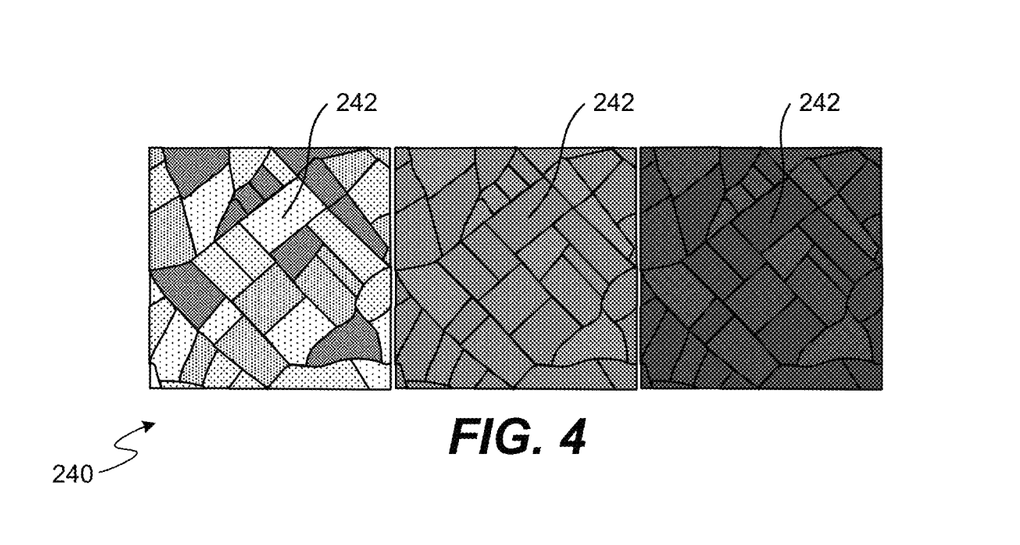
FIG. 4 illustrates color variations for one segmentation mask.

FIG. 4 illustrates color variations for one segmentation mask. Shown are examples 240 of a segmentation mask having different color variations. To use these segmentation masks, we use color variations. These color variations represent the different states each segment can take. Every segment from the mask corresponds to a piece of texture that will be applied at that spot. Based on the available random values different segments may take parts of different color variations. For texture sets with distinct borders, like the crop field segmentation masks in FIG. 3, the color variations are performed for every available segmentation mask (because each segment corresponds to one field). As shown, segment 242 in each of the three color variations retains its shape, each segment having a difference color variation, that the border around each segment remains visible and the same, i.e., a border of trees, road, grass, etc. In general, for human-made biomes such as crop fields, a distinct border that remains the same between segments is important. For other biomes (like forests) segmentation masks with independent color variations suffice. In other words, a biome such as a forest does not have distinct regular shapes like a crop field may have. The shapes are much more fluid. Thus, a forest biome will have different densities for its segments, such as more trees, fewer trees or no trees. Contiguous segments with no trees, many trees, etc. will not need distinct borders around them as do crop fields.

Improvement to Common Synthesis Approach

Our approach provides random values for every corner of all tiles of the bLoD, which ensures that every segment that references the same corner location receives the same random seed. The common synthesis approach is now modified in the following way:
  Instead of choosing a random texture for a bLoD tile, we choose a random segmentation mask of the corresponding biome.
  Every segment carries a unique identifier and access to a random value via the corner reference for that segment. These parameters ensure that (if executed in parallel) each pixel with the same identifier and random value will be handled in the same way. Through this mechanism we can choose a color variation for each segment of a segmentation mask.

Thus, every corner of every tile in the base level of detail will have access to a random value. As every segment in a segmentation mask has a reference to a particular corner, this reference will reference the random value of a corresponding base level of detail tile. In other words, every tile that is processed is associated with its base level of detail tile, and it is from this base level of detail tile that the random value is obtained for a particular corner.

One may obtain the base level of detail tile from the current tile in the following manner. If the current Lod>bLoD, this means that we are working in a cutout of the bLoD tile but at a higher resolution. Therefore, the bLoD tile will be a parent of the current tile. If the current Lod<bLoD, this means that we are working with more bLoD tiles next to each other. So for example, if the current Lod=bLoD−1, this means that we have 2×2 bLoD tiles corresponding to the current tile. In short, in such a case we to check, for every pixel, in which bLoD tile we currently are in order to process each pixel correctly.

With this approach we can randomly choose different combinations of shapes and colors for every synthesized tile. Even small setups with four segmentation masks and four color variations (16 textures in total) can create results with hard to notice repetitions (see FIG. 5). Other biome types like forests may use more organic shapes in the segmentation masks and may use density variations instead of color variations. In other words, for biomes like crop fields, the segments may have straighter lines, sharp corners and appear more rigid, while for biomes like forests segments may appear more natural, more like blobs, more flowing, etc. For these forests, the delineations between segments in the final 2-D or 3-D synthesized image are not always visible as variations in density of a forest may not appear as lines, corners, etc. Our approach is suitable for a GPU implementation, where we process all pixels of a synthesized tile texture in parallel.

Figure 5:
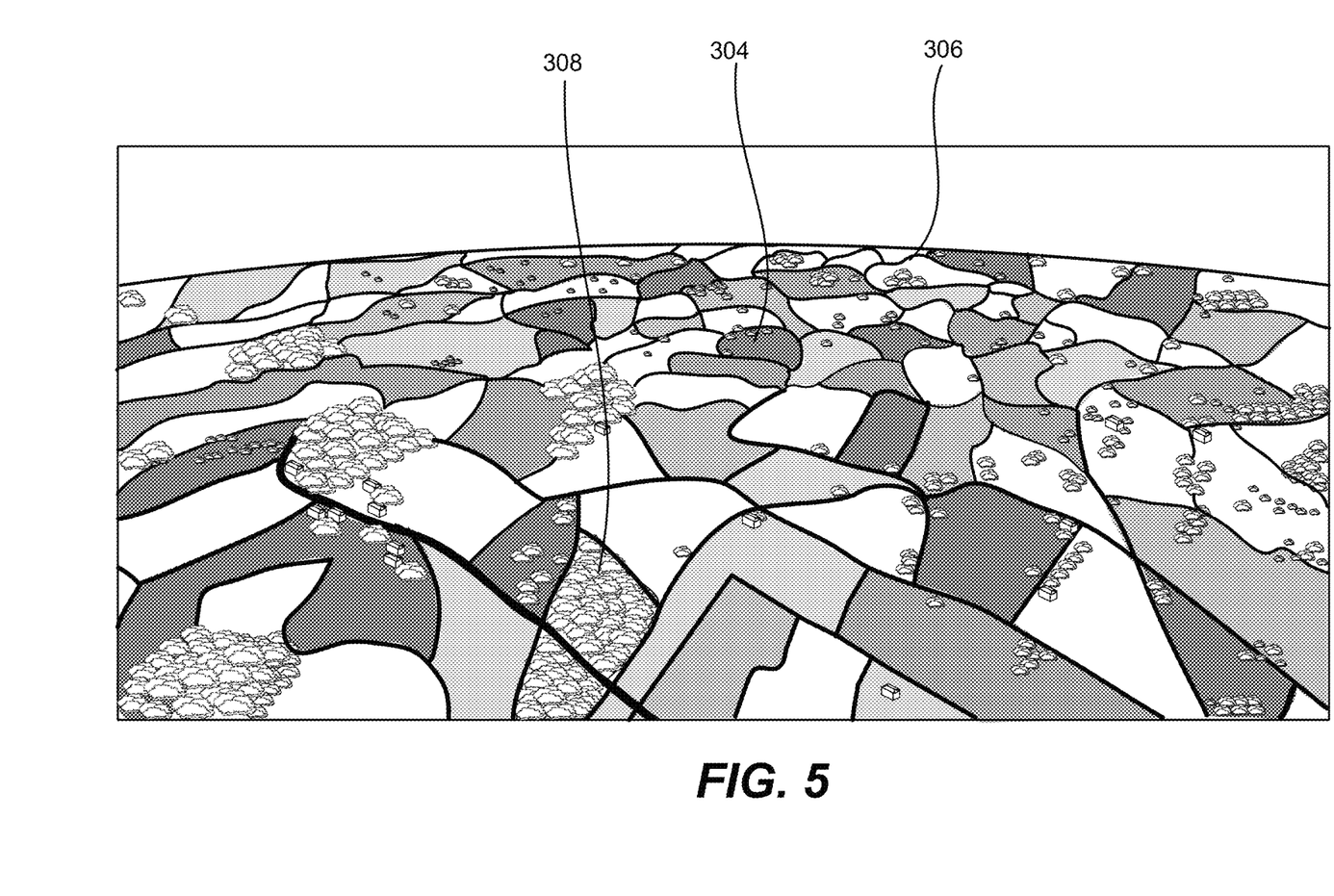
FIG. 5 illustrates a synthesized texture of crop fields using the present invention.

FIG. 5 illustrates a synthesized texture of crop fields using the present invention. In this example, the base level of detail is LT15 where each tile is 1.2 km in width. Shown are numerous tiles side-by-side, and even though tiles may be repeated, the borders of the tiles are not visible. Shown, for example, is a particular segment 304 which is a crop field, having a border 308 (trees) and a border 306 (a road). This figure shows usage of the invention in an application to show that there is no clear repetition if the approach is used for several tiles next to each other in a digital twin software application.

Components and Flow

It is realized that creating synthesized textures as a replacement for aerial imagery of the real world is different from texturing a completely procedural environment for video games or other programs for non-realistic visualizations. In other words, the creator of a video game is free to create and texture regions as desired, whereas replacing aerial imagery must be faithful to the reality of what exists on the ground—the synthesized textures must realistically approximate what exists, i.e., if the coordinates indicate a humid Japanese crop field, then a humid Japanese crop field must be synthesized.

It is necessary to adjust to different sets of data (BD and DEM) whose creation is not always under our control. It is also important to take into account the real-time scenario of the application. More sophisticated methods are possible, but may run the risk of taking too long, even if executed on a GPU. It is not possible to pre-calculate images and store them because the entire world is just too big; small areas may be cached, but not the entire planet. Therefore, the present invention makes use of the below components and flow.

Figure 6A:
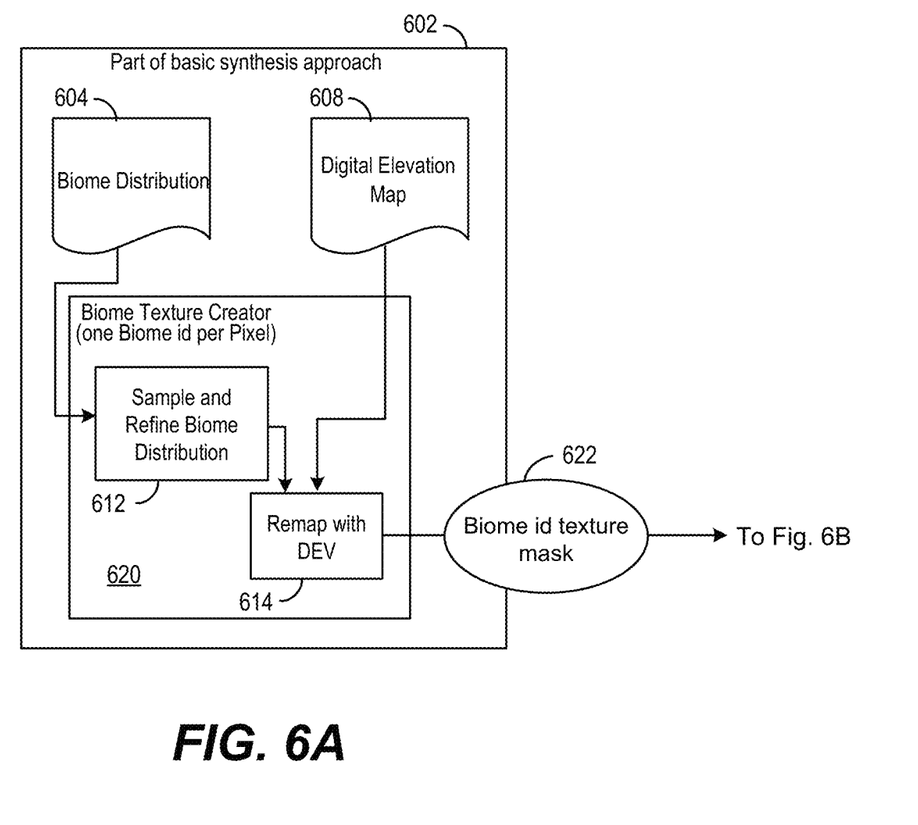
FIGS. 6A and 6B are a block diagram of a system for implementing the present invention.
Figure 6B:
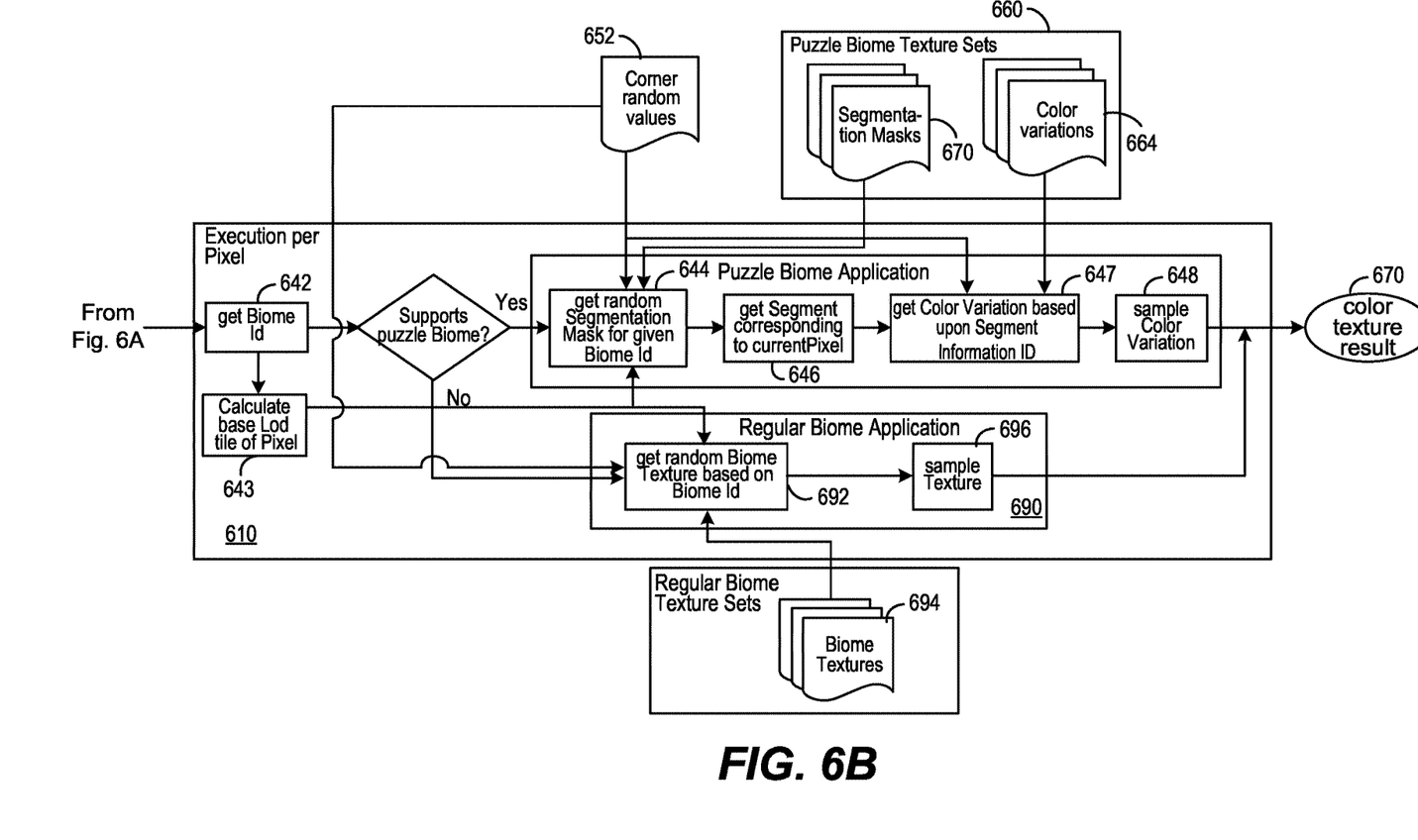

FIGS. 6A and 6B are a block diagram of a system for implementing the present invention. The system may be implemented upon a user's desktop computer or may be partially implemented using cloud computing, although for the system to be usable in an off-line environment, the desktop computer is preferred.

Shown is a module 602 which is part of a basic synthesis approach that includes a biome distribution 604, a digital elevation map 608 and a biome texture creation module 620. For a given tile to be synthesized (any arbitrary level of detail and any arbitrary location), module 602 will output a biome identifier texture mask 622. Input to module 602 will be indices in the quadtree plus an LoD, although an input of geographic coordinates (such as a longitude and latitude) are possible, providing an identification of which tile to synthesize. Biome distribution 604 is a database, basically a global data set that indicates, given coordinates (such as quadtree indices, geographical coordinates or other), which is the biome located at those coordinates, such as an artificial surface, crop field, a desert, forest, etc. Digital elevation map (or model) 608 is also a database indicating the particular elevation for those coordinates.

Biome texture creation module 620 takes input from those two databases and will output a biome identifier texture mask 622 which is basically a mask showing for each pixel of the tile an identifier indicating which is the biome that should be represented by that pixel. Step 612 samples the biome distribution 604 for each pixel in the tile and returns an identifier for every pixel of that tile indicating a particular biome, i.e., crop field, forest. Next, step 614 will use input from the digital elevation map 608 in order to remap the biome for particular pixel if necessary. For example, if the surface at that pixel is flat then no remapping is necessary. If the surface is inclined, steep or at a higher elevation, then the biome may be remapped to be rubble, rock, cliff or even snow. Such a remapping results in a different identifier for that particular pixel. Accordingly, the output will be a biome identifier texture mask 622 (or biome identifier mask) with a biome identifier for each pixel of the tile. In other words, a tile's worth of pixels will input into block 610 in parallel.

Module 610 inputs the biome identifier mask 622 and executes upon each pixel of that mask in parallel, preferably upon a GPU. A first step 642, for each pixel, obtains the biome identifier from the biome identifier mask 622. In a next step 643, the biome identifier is used to calculate the base level of detail tile of that particular pixel.

Because we are working on a pixel basis, we make decisions at the pixel level (in parallel on the GPU). Thus, given the LoD being processed we need to find out to which bLoD tile the pixel belongs. As described above, if the current pixel has LoD>=base Lod, this means that all pixels belong to the same bLoD tile. On the other hand, if LoD<base LoD, this means that we have a grid of bLoD tiles and neighboring pixels might correspond to different tiles. Step 643 is used to find out to which tile the current pixel belongs.

Module 690 shows how a regular biome application would process the biome identifier. In step 692 a random biome texture is retrieved based on the biome identifier from one of the biome texture sets 694. Based upon this biome texture a sample texture is created in step 696 and that is the color texture result that is output in step 670. As pointed out above, this approach is problematic in that use of a particular biome texture for all the pixels in a particular relatively flat region (such as a crop field) leads to repetition that is easily visible. Nevertheless, some biome identifiers will not indicate (or support) our puzzle biome, in which case module 690 will be used.

Preferably, once the biome identifier is retrieved in step 642 it is passed into step 644, although an intermediate step determines whether this biome identifier supports the puzzle biome. If the biome identifier supports a puzzle biome then control moves to step 644 where a puzzle biome will be used, if not, control moves to step 692 where regular biome texture sets will be used.

The puzzle biome application module 640 will, for each pixel of the tile, retrieve a segmentation mask and apply a color variation based upon the particular segment corresponding to the current pixel and output that color texture result.

Within database 660 are any number of puzzle biome texture sets, each set including any number of segmentation masks 662 for that set, along with any number of color variations 664 for that set. As mentioned above, each set represents any of a wide variety of biomes. Preferably, each texture set includes base level of detail textures with base level of detail resolution. Further, texture sets 660 need not necessarily be databases but may be a data provider with storage. For optimal off-line processing, texture sets 660 are located on the desktop computer or in close association and need not be accessed over the Internet. Random values 652, on the other hand, should be generated at run time, to be located in memory of the computer.

In step 644 the biome identifier is used to retrieve a random segmentation mask for that particular biome. The biome identifier is used to identify a set of segmentation masks 662 that correspond to that biome, and using a generated random number, a random segmentation mask for that particular biome is returned to step 644. The random number may be generated as follows. Using input from step 643 we know that the current pixel in the current tile corresponds to one specific base level of detail tile. Next, we read the random values from all four corners of the current tile and based upon those random values we calculate a random index into the set of segmentation masks for the identified biome. As mentioned, random values are stored at the bLoD; thus the random value is based on the bLoD tile to which the current pixel corresponds. And, as mentioned, the base level of detail tile can be a higher level of detail or a lower level of detail than the current tile that is being processed. The corner random values are associated with every bLoD tile in the world. Advantageously, as the segmentation masks are few in number compared to all tiles, and as we want all tiles to look as differently as possible, we combine a global set of random values with the segmentation masks in order to obtain different results even if we choose the same segmentation mask. Also, every biome has its own set of segmentation masks. So, for every biome, a mask out of its set is chosen, but for all pixels of the same biome that correspond to the same bLoD tile, the same segmentation mask is chosen.

In one specific embodiment, in order to create a random value for a tile based upon the random values of the tile corners, the random index may be calculated by first taking the four random values from the corners, calculating the mean, and then multiplying by the number of different segmentation masks in that set to obtain the random index. And, this mean is used to determine which segmentation mask is used for every bLoD tile.

Next, in step 646 we retrieve the segment from the returned segmentation mask corresponding to the pixel being processed. Once the segment is known, we now have a unique identifier for that segment and its reference to particular corner which also holds a random value (using the R,G,B channels as described above, e.g.). For example, referring to FIG. 2, if the current pixel being processed is located within the area bounded by segment 210 of segmentation mask 200, then we know to return segment 210 in step 646. Because every pixel within that segment will have the same segment identifier and will reference the same corner (and hence, the same random value), this means that each pixel in the same segment will result in the same color texture.

Next, step 648 retrieves the color variation based upon the segment information, i.e., the segment unique identifier and in the random value of its referenced corner. More specifically, the segment unique identifier may be combined with the random value by addition, multiplication, or a more sophisticated combination. They are combined to form a value with which we can then choose the color variation. This value may be used to obtain a particular color variation from database 664 as explained above, and more specifically by the formula: (id+random_value) modulo color_variation_count. For regions such as crop fields or other man-made regions with defined borders, if the pixel corresponds to a border (such as a road, trees, fence, etc.) then the border will not change color across color variations. In other words, a black fence between two neighboring segments of different colors will always appear black.

Next, step 648 sample color variation is performed. In this step, we take the pixel (of the color variation texture that we chose) that corresponds to the pixel we are processing and output it.

Figure 7:
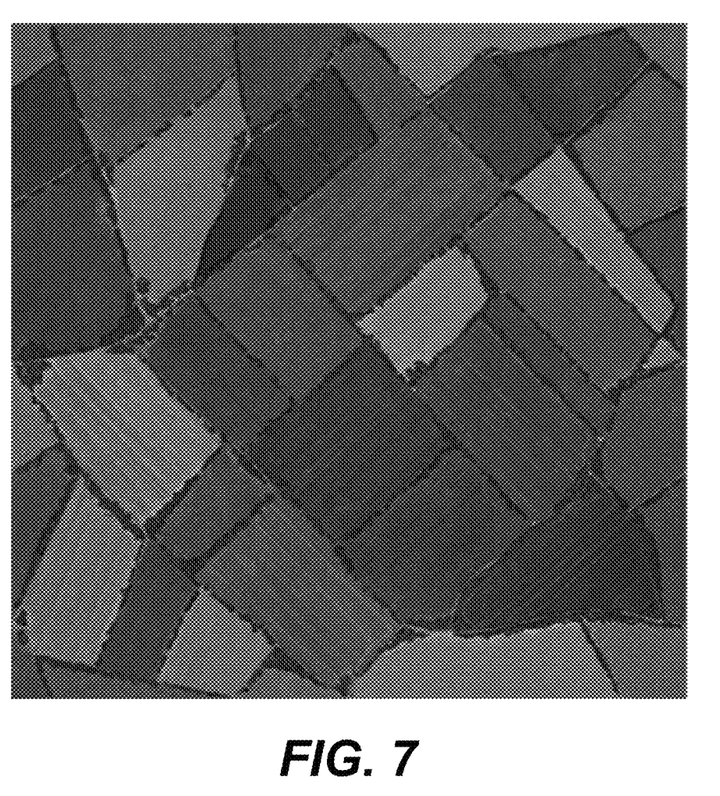
FIG. 7 illustrates a final result of a tile of a crop field area with synthesized color textures.

Finally, in step 670 the color texture result for this particular pixel is output. As all pixels of the tile originally identified in module 602 are being processed in parallel, this tile with its fully synthesized texture of a biome specific to its location may be output in two dimensions and may appear as one of tiles 240 of FIG. 4. Or, this two-dimensional tile may be rendered in three dimensions (along with many other tiles) and may appear as a three-dimensional landscape as shown in FIG. 5. Or, the tile may appear as shown in FIG. 7, a crop field area with synthesized color textures. Of course, each segment may appear as a different color (or some segments have the same color) according to the color variations used that are appropriate to the crop field biome, even though the FIG. 7 only appears as shades of gray, black and white.

Computer System Embodiment

Figure 8A:
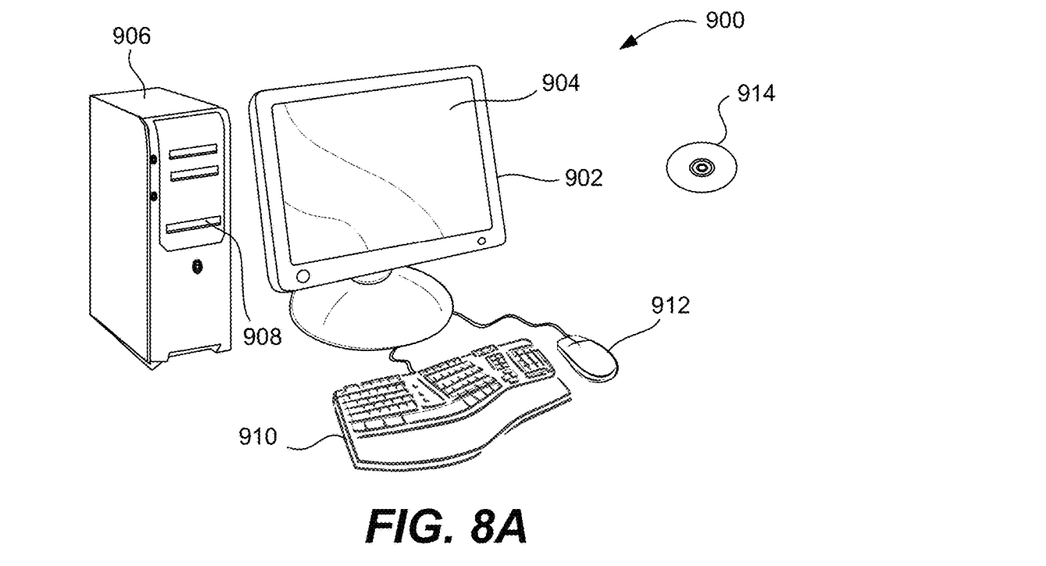
FIGS. 8A-8B illustrate a computer system suitable for implementing embodiments of the present invention
Figure 8B:
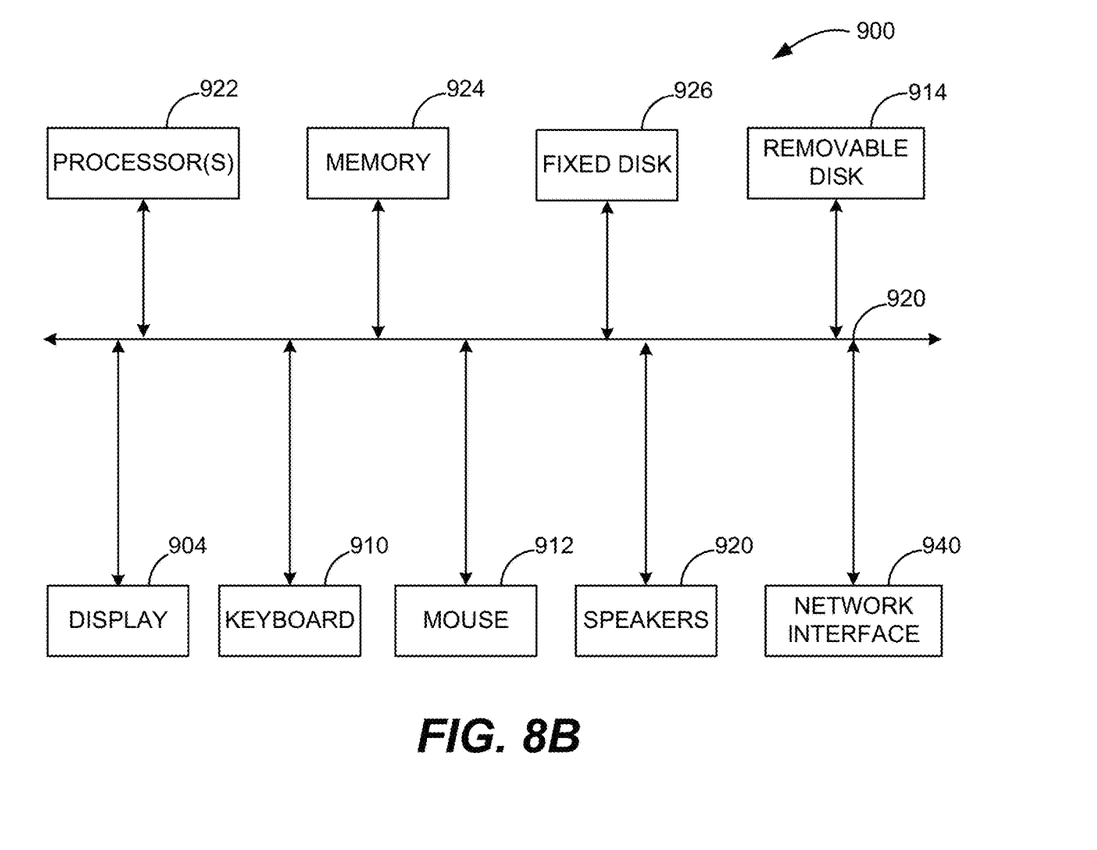

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of synthesizing texture of a tile representing an image of a region on the Earth, said method comprising:
   inputting coordinates of a location on the Earth and identifying a tile to synthesize;
   for each pixel in said tile, providing a biome identifier;
   retrieving a random segmentation mask according to said biome identifier, said segmentation mask having a plurality of segments each with a unique identifier and each referencing a random value;
   for each pixel in said tile,
      retrieving one of said segments corresponding to said each pixel,
      retrieving a color variation based upon said unique identifier and said random value of said retrieved segment, and outputting for said each pixel said color variation, wherein pixels in the same segment will have the same color variation; and outputting said pixels of said tile each with said color variation as a two-dimensional representation of said tile.

2. A method as recited in claim 1 further comprising:
rendering said two-dimensional representation of said tile as a three-dimensional image.

3. A method as recited in claim 1 further comprising:
performing said steps of claim 1 in real time, offline, as said coordinates are received from an avatar of a software application that is moving over a representation of the Earth.

4. A method as recited in claim 1 wherein said coordinates are of a flat region of the Earth.

5. A method as recited in claim 1 wherein segmentation mask is one of a set of segmentation masks pertaining to said biome identifier, wherein segments of said masks of said set match one another when a mask of said set is placed next another mask of said set.

6. A method as recited in claim 1 wherein said coordinates are indices in a quadtree of tiles or are geographic coordinates.

7. A method as recited in claim 1 wherein said random value is referenced via a corner referenced by each segment of said segmentation mask.

8. A method as recited in claim 1 wherein each biome identifier is the same.

9. A method of synthesizing texture of a tile representing an image of a flat region on the Earth, said method comprising:
inputting coordinates of a location on the Earth and identifying a tile to synthesize;
for each pixel in said tile, providing a biome identifier, each biome identifier being the same;
retrieving a random segmentation mask according to said biome identifier, said segmentation mask having a plurality of segments each with a unique identifier and each referencing a random value;
for each pixel in said tile,
retrieving one of said segments corresponding to said each pixel,
retrieving a color variation based upon said unique identifier and said random value of said retrieved segment, and
outputting for said each pixel said color variation, wherein pixels in the same segment will have the same color variation; and
outputting said pixels of said tile each with said color variation as a two-dimensional representation of said tile, each segment of said mask being delineated from adjacent segments in said two-dimensional representation of said tile.

10. A method as recited in claim 9 further comprising:
rendering said two-dimensional representation of said tile as a three-dimensional image.

11. A method as recited in claim 9 further comprising:
performing said steps of claim 8 in real time, offline, as said coordinates are received from an avatar of a software application that is moving over a representation of the Earth.

12. A method as recited in claim 9 wherein said coordinates are of a crop region of the Earth.

13. A method as recited in claim 9 wherein segmentation mask is one of a set of segmentation masks pertaining to said biome identifier, wherein segments of said masks of said set match one another when a mask of said set is placed next another mask of said set.

14. A method as recited in claim 9 wherein said coordinates are indices in a quadtree of tiles or are geographic coordinates.

15. A method as recited in claim 9 wherein said random value is referenced via a corner referenced by each segment of said segmentation mask.

16. A method of synthesizing texture of a tile representing an image of a forested region on the Earth, said method comprising:
inputting coordinates of a location on the Earth and identifying a tile to synthesize;
for each pixel in said tile, providing a biome identifier;
retrieving a random segmentation mask according to said biome identifier, said segmentation mask having a plurality of segments each with a unique identifier and each referencing a random value;
for each pixel in said tile,
retrieving one of said segments corresponding to said each pixel,
retrieving a density variation based upon said unique identifier and said random value of said retrieved segment, and
outputting for said each pixel said density variation, wherein pixels in the same segment will have the same density variation; and
outputting said pixels of said tile each with said density variation as a two-dimensional representation of said tile, wherein not all delineations between segments of said two-dimensional representation are visible.

17. A method as recited in claim 16 further comprising:
rendering said two-dimensional representation of said tile as a three-dimensional image.

18. A method as recited in claim 16 further comprising:
performing said steps of claim 12 in real time, offline, as said coordinates are received from an avatar of a software application that is moving over a representation of the Earth.

19. A method as recited in claim 16 wherein segmentation mask is one of a set of segmentation masks pertaining to said biome identifier, wherein segments of said masks of said set match one another when a mask of said set is placed next another mask of said set.

20. A method as recited in claim 16 wherein said coordinates are indices in a quadtree of tiles or are geographic coordinates.

21. A method as recited in claim 16 wherein said random value is referenced via a corner referenced by each segment of said segmentation mask.

22. A method as recited in claim 16 wherein each biome identifier is the same.

* * * * *

UNITED STATES PATENT AND TRADEMARK OFFICE
CERTIFICATE OF CORRECTION

| | |
|---|---|
| PATENT NO. | : 11,620,820 B1 |
| APPLICATION NO. | : 17/831031 |
| DATED | : April 4, 2023 |
| INVENTOR(S) | : René Zmugg |

It is certified that error appears in the above-identified patent and that said Letters Patent is hereby corrected as shown below:

In the Specification

Column 9, Line 59, insert --.-- after --manner--.

In the Claims

Claim 10 (Column 11, Line 59), change "claim 8" to --claim 9--.

Claim 18 (Column 12, Line 44), change "claim 12" to --claim 16--.

Signed and Sealed this
First Day of August, 2023

*Katherine Kelly Vidal*

Katherine Kelly Vidal
*Director of the United States Patent and Trademark Office*